INVENTOR.
WILLIAM R. ROBINSON
BY
Kwis Hudson & Kent
ATTORNEYS.

Nov. 30, 1937.   W. R. ROBINSON   2,100,520
EQUIPMENT FOR MAKING ARTIFICIAL ICE
Filed Nov. 8, 1934   4 Sheets-Sheet 3

INVENTOR.
BY WILLIAM R. ROBINSON.
*Kwis Hudson & Kent.*
ATTORNEYS

INVENTOR.
WILLIAM R. ROBINSON.
BY Kwiss Hudson & Kent
ATTORNEYS.

Patented Nov. 30, 1937

2,100,520

UNITED STATES PATENT OFFICE 2,100,520

EQUIPMENT FOR MAKING ARTIFICIAL ICE

William R. Robinson, Niles, Ohio

Application November 8, 1934, Serial No. 752,097

7 Claims. (Cl. 62—162)

This invention relates to equipment for making artificial ice and has for its principal object to provide certain improvements such that a given weight or amount of ice can be produced in less time than heretofore.

A further object is not only to reduce the freezing time but also to provide an arrangement of the piping for the brine or other freezing fluid or for both the brine and the air for water agitation in connection with a series of cans or cans and a supporting grid, so that the series of cans and the piping can be lifted and removed from the brine tank as a unit when the piping is first disconnected from the main brine or air and brine lines and so that the piping can be lifted as a unit from the cans when it is desired to dump the latter.

In brief, it is the second object to provide a novel construction and arrangement of internal freezing units, preferably with a special and novel arrangement for agitation of the water by air to produce clear merchantable ice, to reduce the freezing time, and to reduce the time and labor required in handling or moving the freezing units and the piping which, in accordance with the present invention, is movable as a unit with respect to a series of cans, or both the freezing units and piping and the series of cans can be moved as a unit, whichever may be found desirable and depending in part upon whether the purpose for which the ice blocks are to be used is such as to require the removal of the core water and, after the removal of the internal freezing units, the filling of these spaces with water so as to form entirely solid blocks.

A still further object is to provide certain improvements in the application of air for agitating purposes, especially an improved arrangement with reference to the internal freezing unit or units.

The above and other objects are attained by the present invention which may be here briefly summarized as consisting in certain novel combinations and arrangements of parts and details of construction which will be described in the specification and set forth in the appended claims.

In the accompanying sheets of drawings, wherein I have shown several embodiments of the invention, Fig. 1 is a top plan view showing a series of cans supported in this instance in a grid and removable from the brine tank as a unit, and the piping for the brine and the water agitation (other methods of water agitation than shown in this view may be employed), which piping, when first disconnected from the brine and air supply means, can be removed as a unit independently of or with the series of cans and can-supporting grid if the construction of the cans requires a supporting grid;

Figure 1:
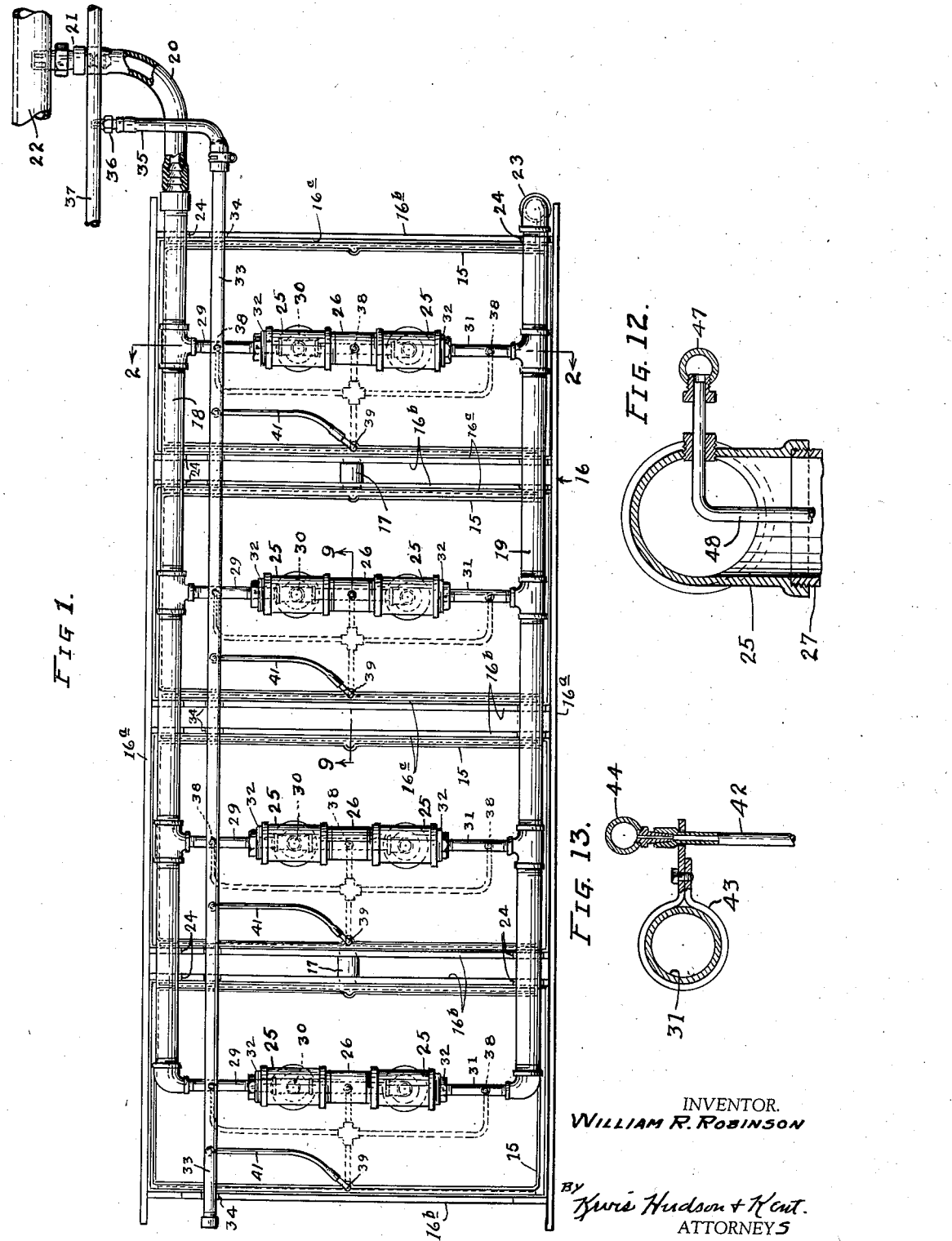
Figure 3:
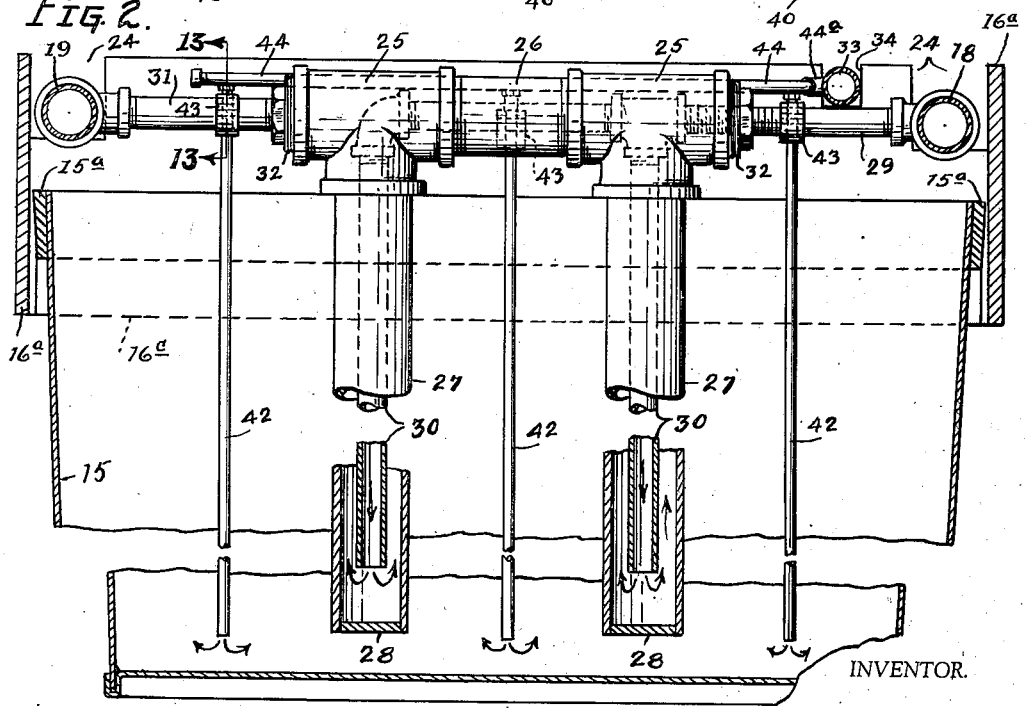
Fig. 3 is a similar transverse sectional view showing an arrangement wherein the agitating air is supplied by a series of drop tubes extending down into the cans from the top.
Figure 4:
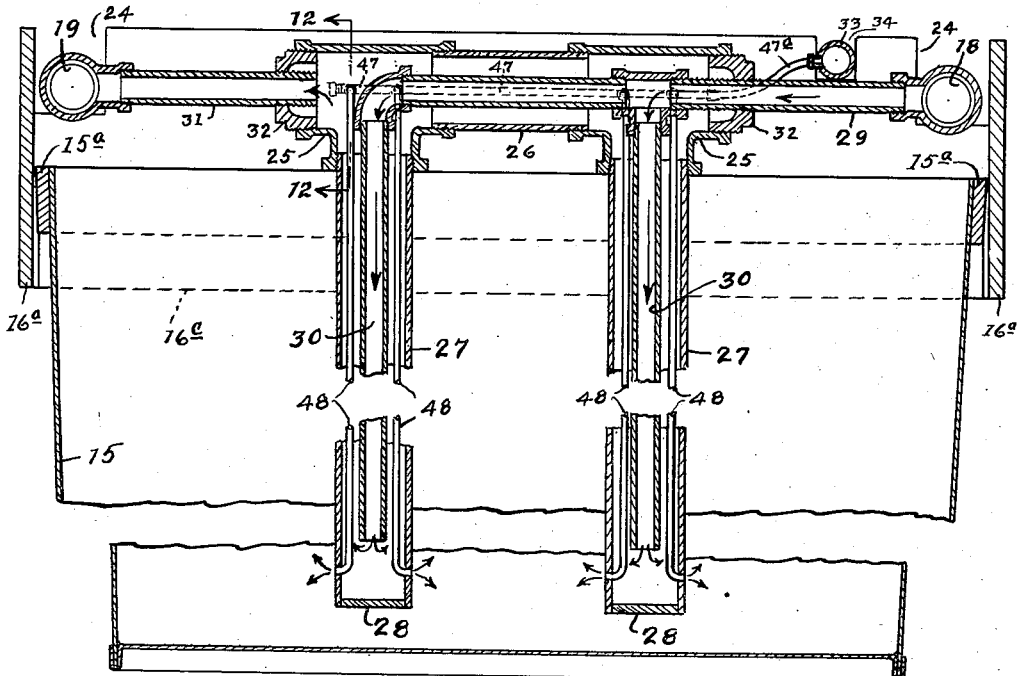
Fig. 4 is a similar view showing a construction wherein the water agitating air tubes are arranged as a unit with internal freezing elements, and in this instance extend down into the outer pipes of the freezing unit.
Figure 5:
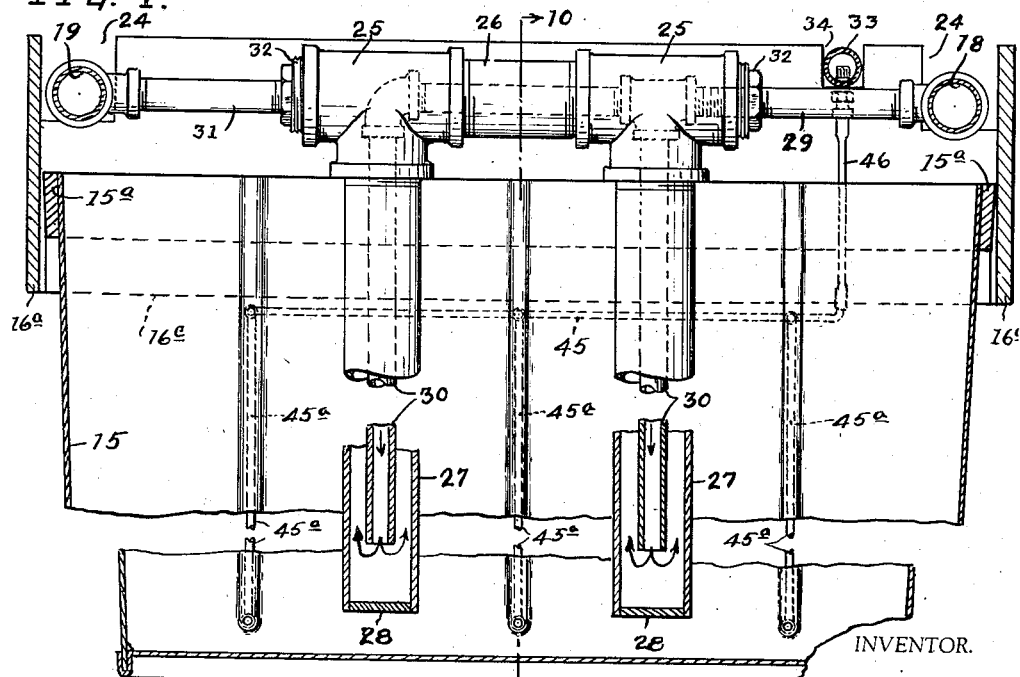
Fig. 5 is a similar transverse sectional view showing a different arrangement of piping for the agitating air, the tubes in this instance being extended down along one side of the can and into the latter through the side near the bottom of the can.
Figure 6:
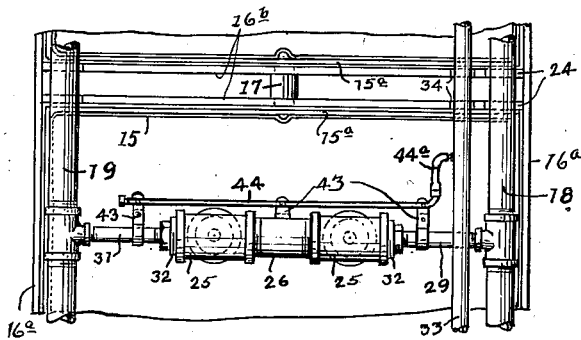
Figure 9:
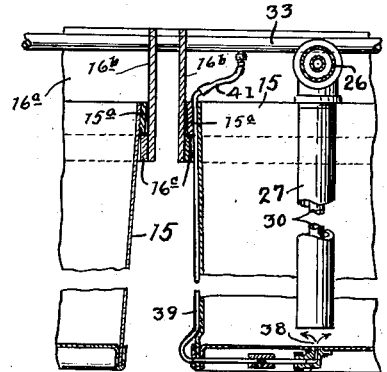
Figure 7:
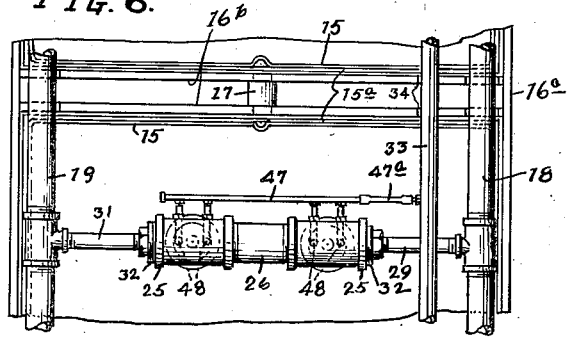
Figure 10:
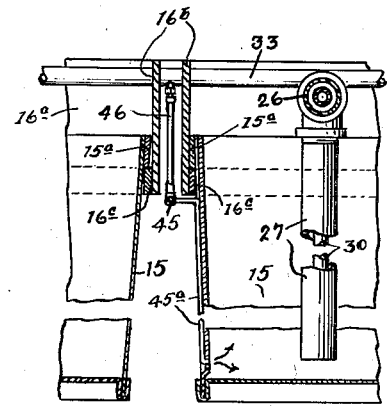
Figure 8:
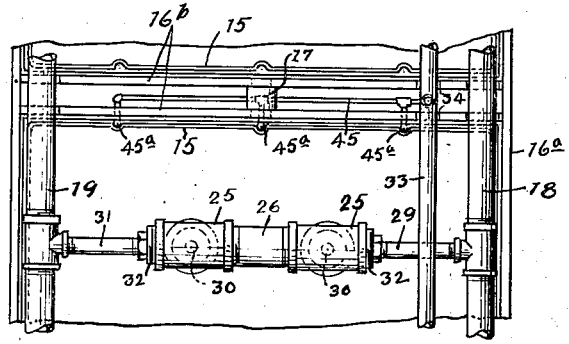
Figure 11:
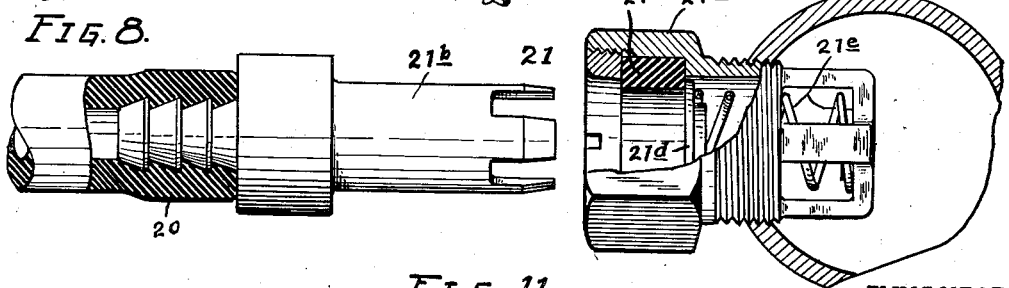

Figs. 6, 7, and 8 are fragmentary plan views showing, respectively, the arrangements of air tubes shown in Figs. 3, 4, and 5;

Fig. 9 is a fragmentary sectional view substantially along the line 9—9 of Fig. 1;

Fig. 10 is a similar view along the line 10—10 of Fig. 5, the scale of Fig. 10 being smaller than that of Fig. 5;

Fig. 11 is an enlarged detail view showing detached the two parts of a combined quick detachable coupling and valve which may be employed between the main brine line and the brine lateral forming a part of the piping unit which serves the series of cans and also between the main air line and the air lateral also forming a part of the piping unit if agitation of the water is required;

Fig. 12 is a fragmentary sectional view on an enlarged scale along the line 12—12 of Fig. 4; and Fig. 13 is a similar sectional view along the line 13—13 of Fig. 3.

In the accompanying sheets of drawings, the cans in which the ice is frozen are shown at 15. Raw water is supplied to these cans whether or not clear ice is required. The details of construction of these cans are in the main immaterial to the present invention as standard or special cans may be employed, as may be found most convenient or desirable. In this instance, a number of cans 15 are arranged side by side and are supported in a grid or frame 16 which is composed of two parallel side members 16a and parallel cross-members 16b which extend along the longer sides of the cans. The cans are supported in the grid 16 by shoulder-forming strips 16c which are secured to the cross members 16b of the grid along the lower edges thereof, these strips being engaged by shoulder-forming strips 15a extending along and secured to the sides of the cans at the top thereof.

The grid 16 and the series of cans 15 supported by it constitute a unit, and, as a unit, these parts are designed to be removed from the brine tank (which is not here shown) when the freezing is completed and as a unit restored into the tank on which it is supported during the freezing operation. The length of the grid and the number of cans which are supported by it may be varied as desired, but, as here shown, the unit includes four freezing cans, this number being shown for convenience only. I have not attempted to show the brine tank in which these cans are inserted for freezing purposes as a brine tank of standard construction is contemplated.

It might be mentioned at this point that the freezing of the water in the cans is accomplished not only by the cooled brine in the tank but also by novel internal freezing units to be explained, the freezing occurring from the sides and ends of the cans inwardly and from the internal freezing units outwardly. Brine is used as the freezing medium, but this term is used in a broad sense as inclusive of any other freezing medium which may be employed. The cooling of the brine may be accomplished in any desired manner.

While in this instance I have shown a series of cans 15 supported in a grid 16, I do not regard it essential that a supporting grid be employed. The important consideration is that the series of cans be lifted into the tank, removed therefrom, dumped, and restored to the tank as a unit regardless of how the individual cans are supported or held together. In some instances, the cans may be secured together or integrally united and thus formed into a unit which can be handled and moved about as such without requiring what is known as a can supporting grid. The unit of cans and grid, or the unit of cans alone in the event the grid is not required, will have suitable provision by which the unit can be lifted from, lowered into, or moved from the brine tank to the dumping point by hoist hooks, and in this instance this is accomplished by arranging, between alternate pairs of cross-members 16b of the grid, hook receiving blocks or pins 17 which are securely fastened between and to the cross-members 16b of the grid. These are shown in Figs. 1, 6, 7, and 8. In some instances, the cans may be independently supported in the tank, in which event one or more may be lifted at a time. In that case, the brine and air laterals may be supported on the framework of the tank or on the cans themselves.

As a part of the present invention, I employ in the cans single or multiple internal freezing units which are extended down into the cans from the top to near the bottom of the cans. Although internal freezing members in general are well known, they have not, as a rule, been satisfactory for the reason that when the blocks of ice are intended for all but a few special uses, it is necessary that the internal freezing members be removed and the spaces previously occupied by them filled with water which is then frozen to form solid blocks, and, as these internal freezing members have been constructed, they have occupied so much space in the cans that an exceedingly long period of time was required to freeze the water supplied to fill the spaces previously occupied by them. Furthermore, in some cases good clear ice was not obtainable because of lack of proper agitation.

Instead of using a single internal freezing unit which, in practice, has generally been oblong in shape and extends a considerable distance crosswise of the can and thus displaces a considerable amount of the water initially supplied to the can to be frozen, I employ in each can one or more internal freezing members which are relatively small in volume. In some instances where the can is small and generally square in cross-section, a single centrally disposed freezing unit can be employed, but, generally, the size and proportions of the can are such that the best results are obtained by the use of a double internal freezing unit having two spaced depending freezing members. When very wide cans are used, multiple freezing members having more than two depending freezing portions may be employed. By using multiple freezing units, a less volume of water will be displaced than if a single relatively large unit is employed, and the freezing time is considerably reduced.

In some instances, as when the ice is to be used in packing refrigerator cars or for making ice cream and the like, clear ice is not essential, but when clear ice is required, some suitable means for agitating the water will be employed, and, while so far as certain features of the invention are concerned, it is immaterial what method of agitation is employed, preferably provision is made for supplying air for agitating purposes, the air being supplied preferably between the depending members of the internal freezing units and also between the depending freezing members and the walls of the can, i. e., in the regions where the freezing last occurs.

Accordingly, the unit arrangement of piping for a series of cans in some instances will consist of the internal freezing units and the pipes for supplying brine to and discharging it from the freezing units. However, generally the piping unit includes in addition to the internal freezing units and the brine piping connected thereto for all the different cans of the series, the necessary piping and tubes for supplying air to the several cans of the unit for agitating purposes.

Considering next the piping unit referred to above, this unit includes a brine supply pipe or brine lateral 18 and a brine return pipe 19, the former being connected at one end by a flexible pipe or hose 20 and by a quick detachable coupling and valve 21 (to be referred to presently) to a main brine supply pipe 22 which supplies brine separately to the different series of cans which there may be in the ice making installation, while one end of the return brine pipe 19 is turned downwardly at 23 and discharges into the brine tank in which the series of cans is adapted to be inserted. The brine delivery pipe 18 is seated in notches 24 (see Figs. 1 to 5) formed in the cross-members 16b of the grid next to one of the side members 16a of the grid, and the return brine pipe 19 is seated in similar notches 24 in the cross-members 16b alongside the opposite side member 16a of the grid. Thus these pipes rest upon and are supported by the grid, but in the event the necessity for a can supporting grid is done away with, these pipes will then generally rest in similarly situated notches formed in the top edges of the tank frame.

The brine flows from the brine supply pipe 18 in parallel paths through the different internal freezing units which are inserted from the top down into the different cans of the series. As before stated, if the width of the can is the same or substantially the same on the four sides, a single internal freezing unit will be sufficient, but if it is considerably wider one way than the other, as is the case with standard cans, double internal freezing units are employed, as in this instance, but if the block of ice is to have considerable differences in the two top dimensions, freezing units having more than two depending freezing members may be employed, but in by far the major portion of the cases, double freezing units as here shown will be sufficient. In any event, the principle of construction and the flow of the brine through the unit from the supply pipe 18 to the return pipe 19 will be the same.

Each internal freezing unit includes, as will be clearly seen from Figs. 2 to 5, a U-shaped header or manifold having a top portion and two depending legs, the top portion consisting of two T's 25 and a connecting nipple 26, and the legs comprising two pipes 27 which extend down to near the bottom of the can and are closed at the bottom by disks 28 or otherwise. The T's and nipple of each header constitute the return portions of the double freezing unit and the pipes 27 are the members about which the internal freezing occurs. The brine is supplied from the brine lateral 18 by a relatively small pipe 29 which extends from the lateral into one end of the header and has two vertically disposed branch pipes 30 extending downwardly therefrom centrally through the outer pipes 27 to near the lower ends thereof, these pipes being open at their lower ends so that the brine will flow through the horizontal pipe 29 and through the inner vertical pipes 30 out from their lower ends and up through the outer vertical pipes 27 to the top of the header. The opposite end of each header is connected by a pipe 31 to the return brine pipe 19. The pipes 29 and 31 are supported and held centrally with respect to the ends of the header by being threaded into bushings 32 screwed into opposite ends of the top of the header. By this arrangement, a rigid framework of piping, including the internal freezing units, is provided, the same being rigid enough that it can be readily lifted by a hoist or a pair of hoists from the can unit on which it is normally supported.

If it is desired that the freezing units have more than two depending freezing legs, the construction will be the same except that the number of T's 25, nipples 26, and vertical pipes 27 and 29 will be correspondingly increased.

The internal freezing units shown in Figs. 1 to 5 are identical except in Fig. 4, the freezing unit is modified in the respect that it contains air tubes for agitating purposes, and the various forms of the invention herein illustrated differ only in the modes of supplying the agitating air.

As before stated, the piping unit of this invention generally includes also an air supply system for agitating the water being frozen in the different cans, and when agitation is required, as when clear ice is being made, the piping unit includes also an air supply pipe or air lateral 33 which is received in notches 34 formed in the cross-members 16b of the grid (or in the tank frame if a grid is not required) close to the brine lateral 18, this air supply lateral 33 resting on the transversely extending pipes 29 of the freezing units. One end of the air lateral 33 is connected by a hose 35 and by a quick detachable valve and coupling 36 to a main air line 37 shown in Fig. 1, the opposite end of the air lateral 33 being closed. Obviously, on detaching the hose sections 20 and 35 (at the couplings 21 and 36 respectively) from the main brine pipe 22 and main air pipe 37, the air lateral 33 can be lifted with the brine piping as a unit, it being understood that when the couplings 21 and 36 are disconnected, the female portions of the couplings which are attached to the brine pipe 22 and air pipe 37 are automatically closed.

In Fig. 11 I have shown detached the two parts of the coupling 21 which connects the hose 20 to the main brine line 22, a standard form of coupling being here illustrated. This coupling has a female part 21a which is screwed into or otherwise attached to the brine pipe 22, and it has a male part 21b to which the hose 20 is attached and which is designed to be slid into the female part 21a, at which time it has a tight fit in a gasket 21c of rubber composition or other suitable material. The female part has a valve 21d which, when the coupling is depressed, is pressed against the seat or gasket 21c by a spring 21e, and when the coupling member 21b is inserted in the member 21a, it lifts the valve disk 21d off its seat, but when the coupling is disconnected, the valve is automatically seated and thus stops the flow of brine. A suitable combined coupling and valve similar at least in principle to that illustrated in Fig. 11 may be employed for connecting the hose section 35 to the air lateral 37.

Figure 2:
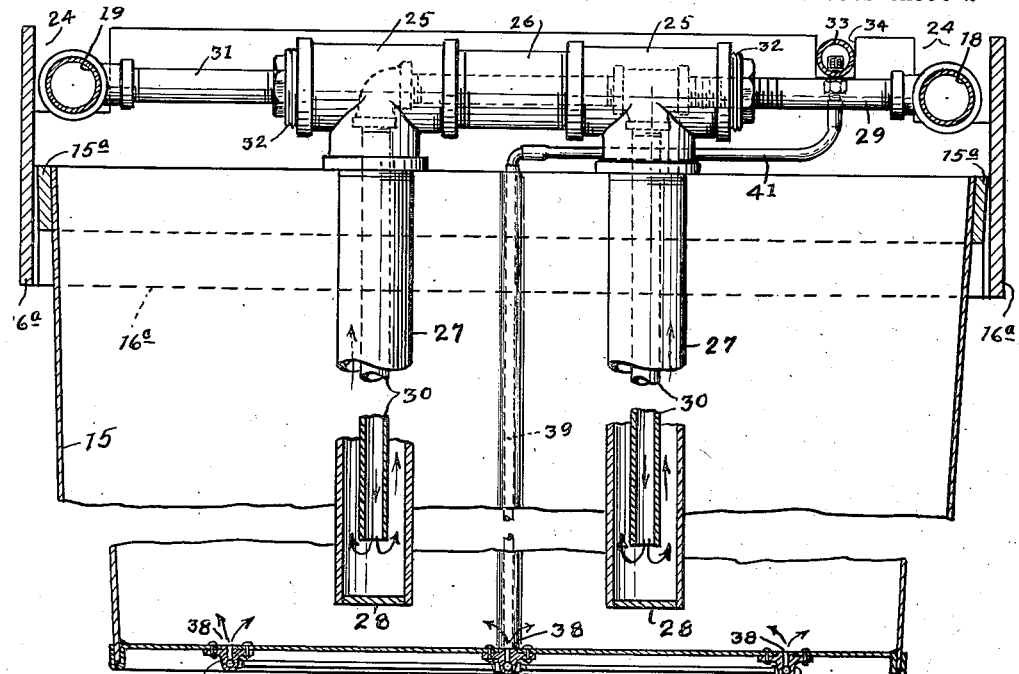
Fig. 2 is a transverse sectional view substantially along the line 2—2 of Fig. 1, the agitating air being here introduced in the bottom of the can at three points.

With the system or application of air agitation illustrated in Figs. 1 and 2, the air is admitted to the bottom of each can at three points 38, one between the two internal freezing pipes 27 and the others between the latter and the narrower sides of the can. For this purpose an air tube 39 is extended in a groove down one outer wide side of each can to the bottom of the latter and for a short distance laterally inward under the can where it is connected by branches to three so-called flanges 40 secured to the bottom of the can in the center longitudinal plane thereof (Figs. 2 and 9) and extending up through the bottom of the can as illustrated in the figures last referred to so that the air will be discharged upwardly at the points 38. The upper end of the tube 39 (which extends down in a groove in the side of the can, as stated above) is connected by a hose 41 and a suitable coupling to the air lateral 33, each hose connection with the air lateral 33 being made at one side of each of the several cans 15. Thus the air will agitate the water in the regions or vicinities that are last to freeze, namely, the regions that are most remote from the internal and the external freezing zones.

In the arrangement shown in Fig. 3, the air agitation between the pipes 27 of each internal freezing unit and between the latter and the narrow sides of each can is accomplished by means of drop air tubes 42 which are supported by clips 43 (see Fig. 13) from the pipes at the top of the associated internal freezing unit, and these are connected to a pipe 44 which in turn is connected by a hose section 44a with the air lateral 33. In this instance, the hose connection with the air lateral is made alongside the top of the freezing unit.

With the arrangement shown in Figs. 5, 8 and 10, the air is supplied by a tube 45 having branches 45a extending in grooves down along the wider side of each can and discharging into the side of the can near the bottom at points between the pipes 27 of the internal freezing unit and between the latter and the narrower sides of the can. The tube 45, which extends alongside the can near the grid, is connected by a hose 46 and a coupling to the air lateral 33.

With the arrangements illustrated in Figs. 2 and 9 and in Figs. 5, 8 and 10, when it is desired to dump the ice blocks from the cans, the hose sections 41 and 46 must, of course, be disconnected from the air lateral 33 before the piping unit can be lifted from the cans. With the drop tube system illustrated in Figs. 3 and 6, the air tubes 42 must be first warmed by suitable warming fluid, and, after being disconnected, are lifted from the ice blocks.

However, with the novel application of air agitation illustrated in Figs. 4 and 7, the air tubes need at no time be disconnected from the air pipe or lateral. This is accomplished by extending an air tube 47 connected by a hose section 47a to the air lateral 33, into the upper part of the header of the internal freezing unit and extending branch tubes 48 down alongside the inner brine pipes 30 inside the outer brine pipes 27 to outlet openings provided either in the annular walls of the pipes 27 near their lower ends, substantially as shown in Fig. 4, or to openings in the closures at the lower ends of the pipes 27, preferably the former. As illustrated in Fig. 4, two of the air tubes discharge inwardly more or less toward each other into the water occupying the space between the downwardly extending legs of the freezing unit and two discharge laterally outward into the spaces between the legs of the freezing unit and the adjacent narrow sides of the can. It may not be essential that two streams of air be discharged into the space between the legs of the freezing unit, but at times one may be sufficient, in which event one of the legs will contain one air tube only while the other contains two. Or in the event that two tubes discharge into this space, the direction of each air jet may be angularly disposed with reference to the central plane of the can instead of in line with each other or in the same plane.

Thus it will be seen that with the form of my invention illustrated in Figs. 4 and 7, the tubes for the agitating air constitute a part of the internal freezing unit and no disconnection need be made at any part of the air supply system when the piping unit as a whole, i. e., the brine and the air supplying portions, is lifted from the cans after the legs of the internal freezing unit have been released from the ice frozen about them in the manner hereinafter explained. I believe I am the first to combine the tube or tubes for supplying agitating air with the pipe or pipes of the internal freezing unit, and therefore this part of the invention is broadly claimed herein irrespective of the arrangement of the air supplying tube or tubes with respect to the upper part of the internal freezing unit and with respect to the downwardly extending leg or legs thereof. For example, I do not regard it as essential that the air tube or tubes which are extended down along the leg or legs of the internal freezing unit be inside the outer pipe 27, although that arrangement is preferred, for in some instances the same may be extended down along the outer side or in a groove formed in the outer side of the pipe 27 or otherwise, the important consideration being that it is embodied with and forms a part of the internal freezing unit so as to be removable therewith but is capable, nevertheless, of delivering the air for agitating purposes into the water to be frozen adjacent or at a suitable height above the bottom of the can and laterally outwardly from the leg or legs of the freezing unit or otherwise, as may be found desirable.

With the freezing equipment herein illustrated and embodying any of the forms of my invention, the series of cans will be lowered into a brine tank whose brine will be cooled in any of the usual ways, and, after the cans are filled to a suitable height with water (raw water is generally used), the brine lateral 18 and the air lateral 33 will be connected to the brine supply pipe 22 and the air supply pipe 37 respectively, whereupon brine will pass from the lateral or supply pipe 18 to the return pipe 19 in parallel through the different freezing units of the several cans of the series, and at the same time agitating air will be supplied to or near the bottom of each can so as to pass upwardly more or less between the legs of the freezing unit in each can and between the legs and the narrower sides of the can or otherwise at points where the water last freezes. When the ice blocks are frozen, the brine lateral 18 will be disconnected from the main brine supply pipe 22 by simply disconnecting the parts of the coupling 21, and, likewise, the air lateral 33 will be disconnected at the coupling 36. A warm fluid will then be passed temporarily through the internal freezing units until the pipes 27 are released from the ice frozen about them, and if solid blocks are to be produced, the air and brine piping unit will be elevated after first disconnecting the air tubes from the air lateral 33, if the air agitating systems of Figs. 1 and 2 and of Fig. 5 are employed. If the air agitating system of the drop tube type illustrated in Fig. 3 is employed, the drop tubes will be released from the ice by a warming fluid, but, as stated above, if the arrangement illustrated in Fig. 4 is utilized, wherein the air tubes are formed as a part of the internal freezing unit, nothing need be disconnected other than the brine lateral and the air lateral from the main brine and air supply pipes 22 and 37. Then the core water can be sucked out of the blocks where the agitation occurred and the openings in the blocks formed by the removal of the internal freezing units and the removal of the core water will be filled with fresh water and the freezing will be continued until the blocks are solid. Then the series of cans with the grid will be removed to the point where the ice blocks are released from the cans, after which the blocks will be dumped from the cans.

If it is not essential that the core water be removed, or, if removed, that the core spaces and the spaces occupied by the legs of the freezing units be filled with water and frozen, the piping system may be removed with the cans at one time or as a unit, and transported to the dump where the cans are immersed in tepid water and a suitable thawing fluid is passed through the internal freezing units, and, after a very brief interval, the piping can be elevated as a whole and the ice blocks dumped from the cans. In some instances it is desirable to suck out the core water, fill the spaces with water, and freeze the latter without first withdrawing the freezing units and filling the spaces with water and freezing, in which event the ice blocks will have holes where the freezing units previously extended into the ice blocks. However, this in many instances does not affect the salability of the blocks as they consist of clear pure ice. When making blocks of this kind, the last described method of handling the cans and piping will be followed.

With the apparatus herein illustrated, the amount of time required for freezing the blocks, including the water which may be poured into the openings previously occupied by the core water and by the legs of the freezing unit, is greatly reduced over the most efficient ice freezing equipment that is now in use, so far as I am aware, and the time required for connecting and disconnecting the brine and air supply lines and for shifting and manipulating the piping generally is also greatly reduced so that, as a result of these advantages, I am able to produce ice more economically than heretofore.

While I have shown several embodiments of the invention, I do not desire to be confined to the precise details of construction or arrangement shown in the drawings and described above, but aim in my claims to cover all modifications which do not involve a departure from the spirit and scope of the invention.

Having thus described my invention, I claim:

1. A unit for use in connection with a can of ice block making equipment, said unit having one or more depending legs with provision for the circulation of brine therethrough, each leg having an air tube extending lengthwise therethrough for discharging air to agitate the water in the can.

2. An internal freezing and water agitating unit comprising a header or manifold with one or more depending freezing members, a brine pipe extending into the top of the manifold and down along the freezing member or members inside thereof, and an air delivery tube extending into the top of the manifold and down each of the freezing members toward the lower end thereof for discharging air into the water in a can.

3. A combined internal freezing and water agitating unit including a manifold with a top portion and with a depending leg for freezing purposes, the leg being closed at the bottom, means for causing brine to be introduced at the top of the manifold and to be discharged into the lower end of the depending leg, and one or more air tubes extending down along the wall of the leg and attached thereto and at their lower ends adapted to discharge air streams into the water contained in a can.

4. In combination, a series of cans in side by side relationship and transportable as a unit, and a system of brine piping also in the form of a unit and adapted to be transported with or relative to the series of cans, said piping unit including a brine lateral, a brine return pipe, a series of internal freezing members extending between said lateral and the return pipe in parallel relation, pipes rigidly connecting the brine lateral with the adjacent ends of the internal freezing members, and pipes rigidly connecting the opposite ends of the internal freezing members with the brine return pipe.

5. In combination, a series of cans in side by side relationship and transportable as a unit, and a system of brine piping also in the form of a unit and adapted to be transported with or relative to the series of cans, said piping unit including a brine lateral, a brine return pipe, and a series of internal freezing members with portions adapted to be extended down into the different cans and extending between said lateral and return pipe in parallel relation, rigid pipe connections between the brine lateral and the adjacent ends of the internal freezing members, and rigid pipe connections between the opposite ends of said internal freezing members and the brine return pipe, said piping unit including also an air lateral adapted to supply air into air tubes for agitating the water contained in the various cans of the series.

6. In combination, an ice can, a freezing unit having a plurality of spaced freezing portions extending into the can, and means for causing air for agitating purposes to be discharged into the water in the can between the spaced freezing portions and between the latter and the walls of the can, said means including air tubes extending down along each freezing portion and attached thereto.

7. In combination, an ice can adapted to be inserted into a brine tank so that brine may circulate about the walls thereof, a freezing unit having a plurality of depending freezing legs spaced apart in substantially the center plane of the can, and means for discharging air into the water in the can for agitating purposes at a plurality of points located adjacent the center plane of the can so that the water between the freezing legs and between the latter and the shorter sides of the cans will be agitated, said means including air tubes extending down along the walls of the freezing legs and attached thereto.

WILLIAM R. ROBINSON.